(12) United States Patent
Vajravel et al.

(10) Patent No.: US 12,130,695 B2
(45) Date of Patent: Oct. 29, 2024

(54) COLLECTING CRASH-RELATED INFORMATION FOR A SECURE WORKSPACE

(71) Applicant: Dell Products L.P., Round Rock, TX (US)

(72) Inventors: Gokul Thiruchengode Vajravel, Bangalore (IN); Ramanujam Kaniyar Venkatesh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 68 days.

(21) Appl. No.: 18/164,720

(22) Filed: Feb. 6, 2023

(65) Prior Publication Data

US 2024/0264891 A1   Aug. 8, 2024

(51) Int. Cl.
G06F 11/00      (2006.01)
G06F 11/07      (2006.01)

(52) U.S. Cl.
CPC ...... G06F 11/0778 (2013.01); G06F 11/0721 (2013.01); G06F 11/0775 (2013.01)

(58) Field of Classification Search
CPC ............ G06F 11/0778; G06F 11/0775; G06F 11/0721; G06F 11/0712; G06F 11/362; G06F 11/3644; G06F 21/12; G06F 21/50; G06F 21/57
See application file for complete search history.

(56) References Cited

U.S. PATENT DOCUMENTS

| | | | | |
|---|---|---|---|---|
| 11,379,295 B1 * | 7/2022 | Woodhouse | ........ | G06F 11/1484 |
| 2014/0006877 A1 * | 1/2014 | Zhu | ................. | G06F 11/3466 |
| | | | | 714/45 |
| 2019/0056985 A1 * | 2/2019 | Farkas | ............... | G06F 9/45558 |
| 2019/0370104 A1 * | 12/2019 | Wignarajah | ......... | G06F 11/0715 |
| 2023/0083083 A1 * | 3/2023 | Bradbury | ........... | G06F 9/45558 |
| | | | | 726/26 |

OTHER PUBLICATIONS

Karvandi, Mohammad Sina, Hypervisor From Scratch—Part 6: Virtualizing An Already Running System, blog post, Feb. 24, 2019, Rayanfam Blog, https://rayanfam.com/topics/hypervisor-from-scratch-part-6/.
Karvandi, Mohammad Sina, Hypervisor From Scratch—Part 7: Using EPT & Page-Level Monitoring Features, blog post, Jan. 19, 2020, Rayanfam Blog, https://rayanfam.com/topics/hypervisor-from-scratch-part-7/.

* cited by examiner

*Primary Examiner* — Marc Duncan (74) *Attorney, Agent, or Firm* — Kirton McConkie; Brian Tucker (57) ABSTRACT

Crash-related information for a secure workspace can be collected. An extended paging table (EPT) handler can be registered in a hypervisor used to deploy a secure workspace on a user computing device. When a secure workspace is about to crash, the EPT handler can be invoked to collect crash-related information about the secure workspace and the hypervisor on which the secure workspace is hosted. After the crash and when the secure workspace is again deployed, a workspace agent running inside the secure workspace can collect additional crash-related information. All of this crash-related information can be communicated to a host agent and relayed to a management service on a management server to allow the crash-related information to be reviewed and analyzed.

20 Claims, 7 Drawing Sheets

COLLECTING CRASH-RELATED INFORMATION FOR A SECURE WORKSPACE

CROSS-REFERENCE TO RELATED APPLICATIONS

N/A

BACKGROUND

In the context of this application, a secure workspace refers to an isolated environment in which one or more applications may be hosted on a computing device. A secure workspace, which may also be referred to as a sandbox, is oftentimes implemented using a virtual machine or a software-based container. An application hosted in a secure workspace will be isolated from resources in the external environment and from other applications or services hosted external to the secure workspace.

When a secure workspace is implemented as a virtual machine, the secure workspace includes its own operating system which can crash (e.g., BSOD). When an operating system crashes, it is oftentimes desired to evaluate information related to the crash (e.g., a crash dump). However, when the operating system running inside a secure workspace crashes, the crash-related information is distributed across various sources. For example, the pre-crash dump state will be defined both within the secure workspace (e.g., a memory snapshot, host CPUs, and vCPUs' states within the secure workspace) and outside the secure workspace (e.g., the hypervisor's state such as its VMCS region, nested virtualization levels, disk/memory overlay, etc.). Also, the crash dump state will be available via the secure workspace's operating system's disk and memory dump. Simply put, this crash-related information exists on the user computing device on which the secure workspace is deployed, from the hypervisor used to deploy the secure workspace, and inside the secure workspace. No tools exist for evaluating the complete crash-related information for a secure workspace. Therefore, it is difficult for an administrator to review and remediate crashes that occur within a secure workspace.

BRIEF SUMMARY

The present invention extends to systems, methods and computer program products for collecting crash-related information for a secure workspace. An extended paging table (EPT) handler can be registered in a hypervisor used to deploy a secure workspace on a user computing device. When a secure workspace is about to crash, the EPT handler can be invoked to collect crash-related information about the secure workspace and the hypervisor on which the secure workspace is hosted. After the crash and when the secure workspace is again deployed, a workspace agent running inside the secure workspace can collect additional crash-related information. All of this crash-related information can be communicated to a host agent and relayed to a management service on a management server to allow the crash-related information to be reviewed and analyzed.

In some embodiments, the present invention may be implemented as a method for collecting crash-related information for a secure workspace. In conjunction with deployment of a secure workspace on a user computing device, a handler in a hypervisor used to deploy the secure workspace can be registered. The handler can be configured to be invoked when the secure workspace is about to crash. When the secure workspace is about to crash, the handler can collect crash-related information for the secure workspace. The handler can then communicate the crash-related information to a host agent executing on the user computing device outside the secure workspace.

In some embodiments, the present invention may be implemented as computer storage media storing computer executable instructions which when executed implement a method for collecting crash-related information for a secure workspace. In conjunction with deployment of a secure workspace on a user computing device, a handler in a hypervisor used to deploy the secure workspace can be registered. The handler can be configured to be invoked when the secure workspace is about to crash. When the secure workspace is about to crash, the handler can collect crash-related information for the secure workspace. The handler can communicate the crash-related information to a host agent executing on the user computing device outside the secure workspace. After the crash, a workspace agent executing inside the secure workspace can collect additional crash-related information. The workspace agent can then communicate the additional crash-related information to the host agent.

In some embodiments, the present invention may be implemented as a system that includes a management server hosting a management service and one or more user computing devices. Each user computing device includes a host agent and a hypervisor for deploying secure workspaces on the user computing device. The hypervisor includes a handler that is configured to be invoked when a secure workspace is about to crash to collect crash-related information for the secure workspace and to relay the crash-related information to the host agent.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
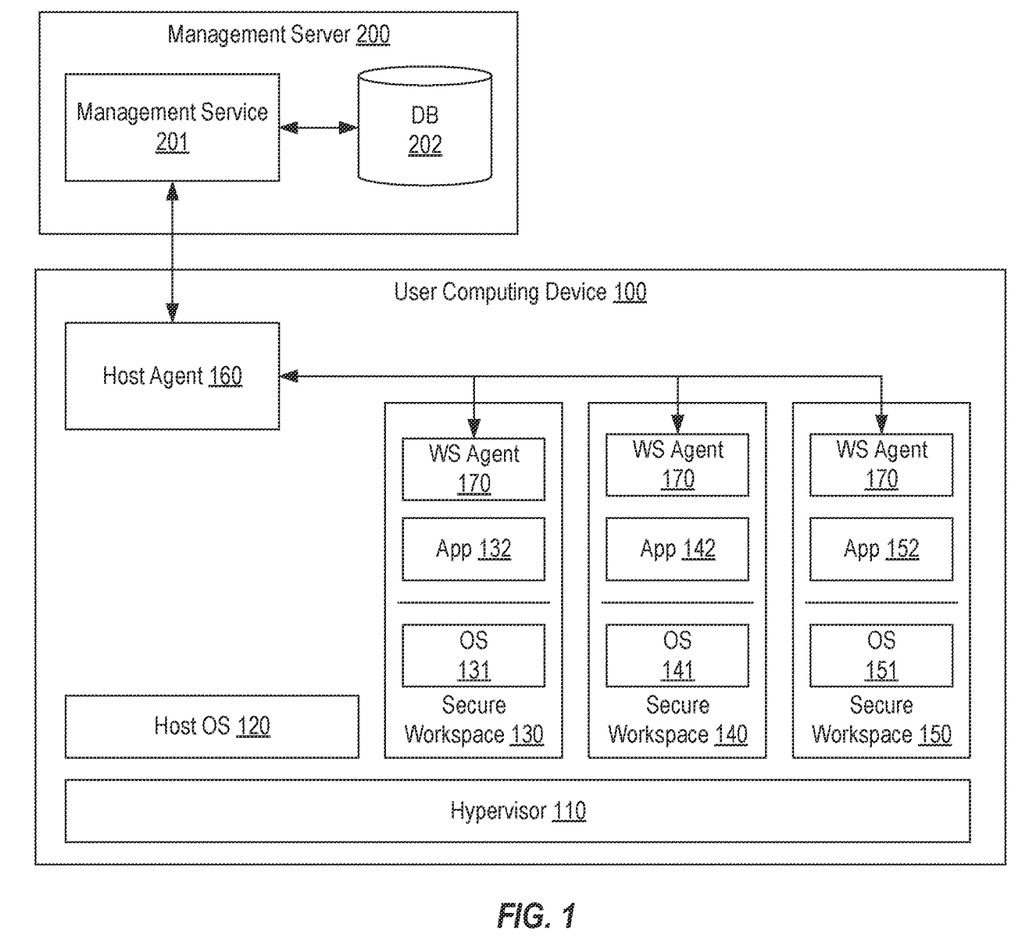
FIG. 1 provides an example of a computing environment in which embodiments of the present invention may be implemented.

FIG. 1 provides an example of a computing environment in which one or more embodiments of the present invention may be implemented. This computing environment includes a user computing device 100 and a management server 200 which is used to manage user computing device 100. Although only a single user computing device 100 is shown, management server 200 may typically be used to manage a large number of user computing devices, any or all of which could be configured in the same manner as user computing device 100 to thereby allow crash-related information for a secure workspace to be collected in accordance with embodiments of the present invention.

User computing device 100 is shown as having a hypervisor 110 which can allow secure workspaces in the form of virtual machines to be deployed on user computing device 100. In this context, a virtual machine should include full virtual machines, micro virtual machines, and other hardware-based containers (e.g., a Windows Sandbox). User computing device 100 can also include a host operating system (OS) 120 on which a host agent 160 may be run.

FIG. 1 provides an example where three secure workspaces have been deployed. Secure workspace 130 is shown as having an operating system 131 and running an app 132. Secure workspace 140 is shown as having an operating system 141 and running an app 142. Secure workspace 150 is shown as having an operating system 151 and running an app 152. Any of these secure workspaces could include any number of apps. A workspace agent 170 is also deployed in each of secure workspaces 130, 140, and 150.

Host agent 160 can be configured to communicate with a management service 201 on management server 200. Management server 200 can maintain or provide access to a database 202 in which can be stored crash-related information pertaining to secure workspaces on user computing devices that management server 200 manages. Host agent 160 can also be configured to communicate with each instance of workspace agent 170.

Figure 2A:
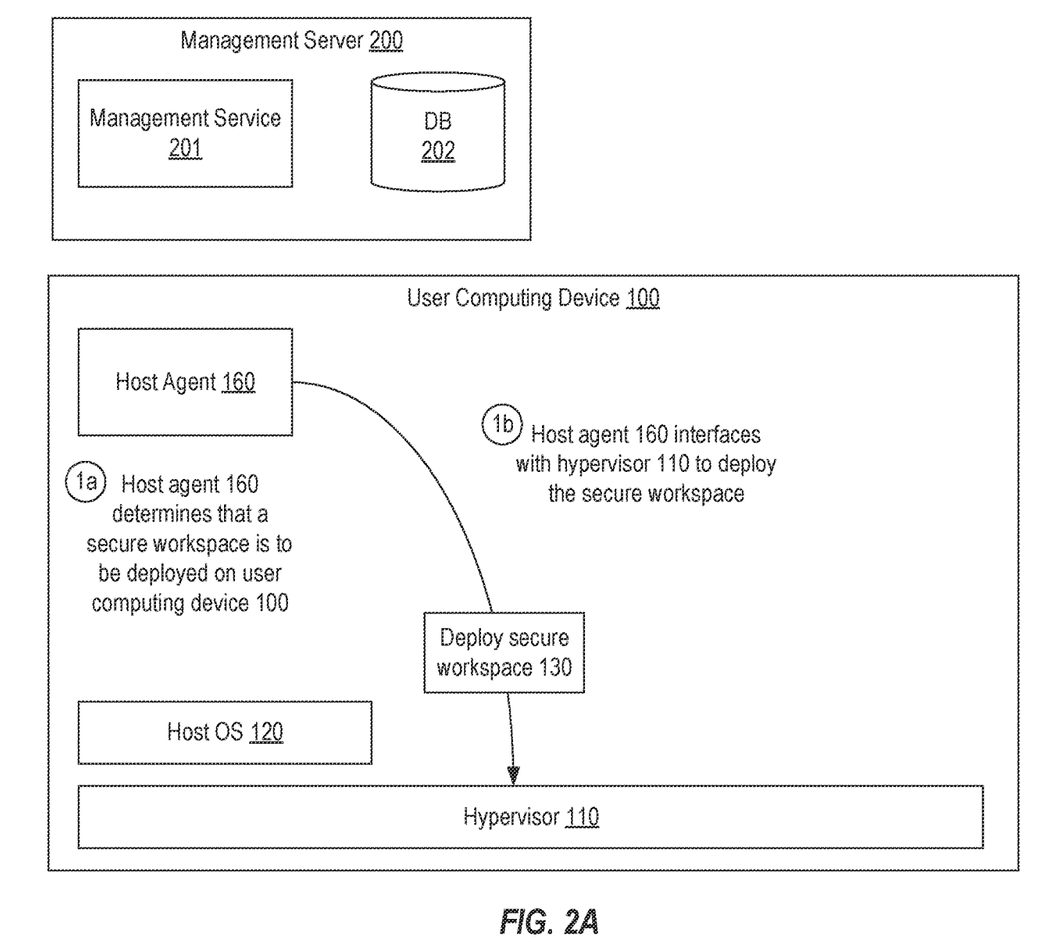
FIGS. 2A-2F provide and example of how crash-related information for a secure workspace can be collected in accordance with embodiments of the present invention.

FIGS. 2A-2F provide an example of how crash-related information can be collected for a secure workspace in accordance with embodiments of the present invention. In FIG. 2A, it is assumed that, as part of user computing device 100's startup, host agent 160 has been loaded and that secure workspaces have not yet been deployed. In step 1a, host agent 160 can determine that a secure workspace is to be deployed on user computing device 100. For example, management service 201 could push a secure workspace (e.g., a .vhdx file) to host agent 160 or host agent 160 could locate a secure workspace stored locally on user computing device 100. For purposes of this example, it is assumed that the secure workspace to be deployed is secure workspace 130. In step 1b, host agent 160 can interface with hypervisor 110 to deploy secure workspace 130.

Figure 2B:
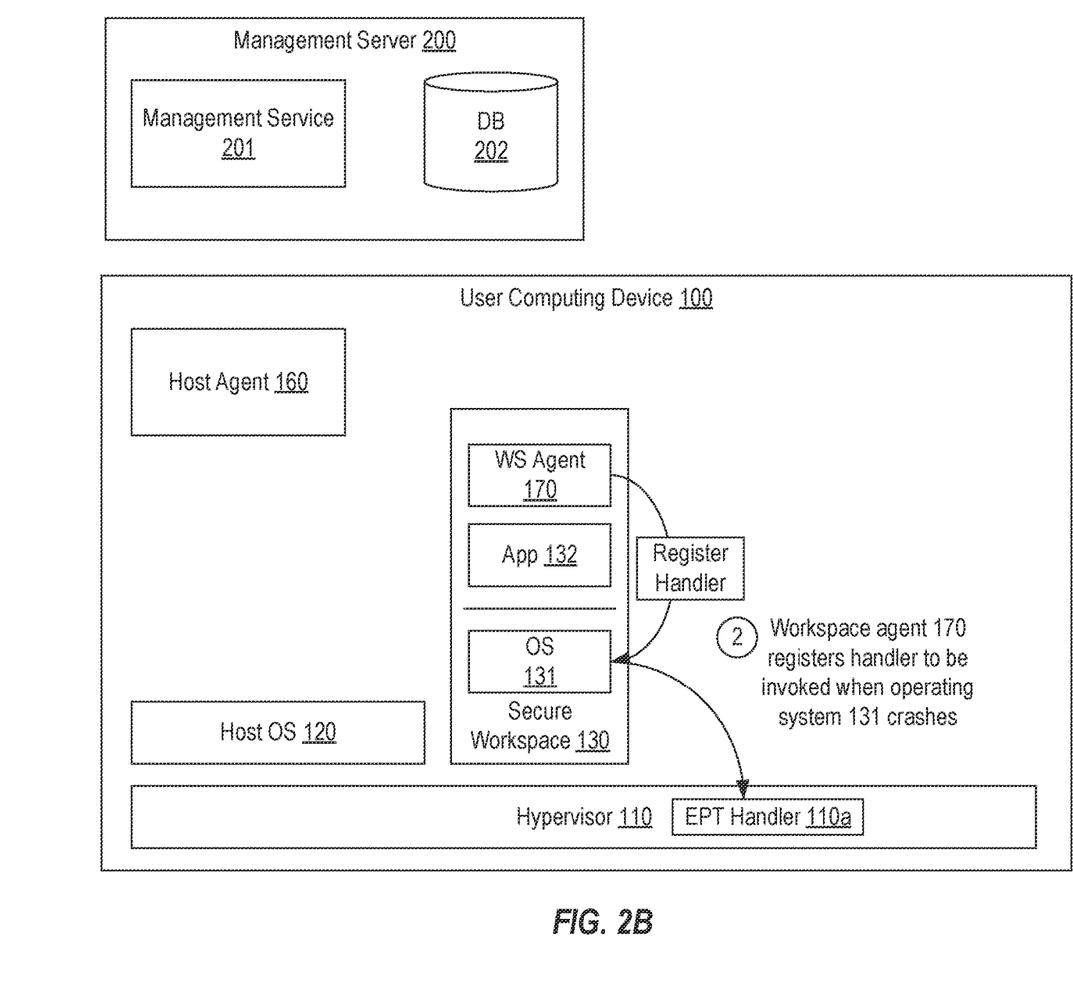

Turning to FIG. 2B, in step 2, and as part of the deployment of secure workspace 130, workspace agent 170 can register an extended paging table (EPT) handler to be invoked when operating system 131 crashes. For example, in Windows-based embodiments, this EPT handler can be registered to be invoked when the KeBugCheckEx API is invoked within secure workspace 130 (e.g., by hooking the KeBugCheckEx API). Accordingly, FIG. 2B shows that EPT handler 110a has been created. Whenever operating system 131 invokes the KeBugCheckEx API, such as in response to detecting an error condition that will lead to a crash, EPT handler 110a can first be invoked to initiate the collection of crash-related information within secure workspace 130. As described in detail below, EPT handler 110a can be configured to communicate with host agent 160 (e.g., via IOCTLs) when a crash occurs to deliver crash-related information it collects.

Figure 2C:
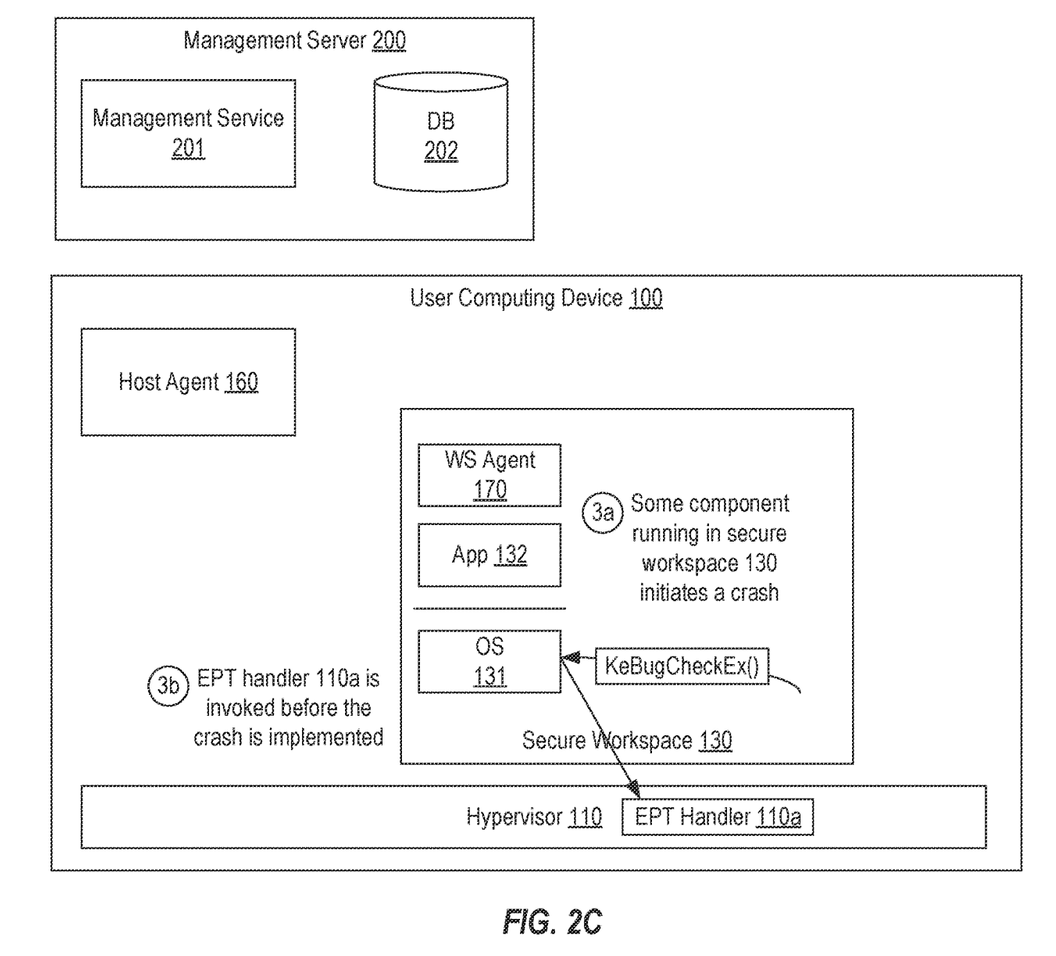

Turning to FIG. 2C, it is now assumed that secure workspace 130 is performing its intended functionality on user computing device 100 such as hosting app 132. Then, at some point and as represented in step 3a, a component running in secure workspace 130 initiates a crash. For example, a kernel-mode component could detect an unrecoverable error and could invoke the KeBugCheckEx API to allow operating system 131 to bring secure workspace 130 down in a controlled manner. However, in step 3b, EPT handler 110a is invoked before operating system 131 handles the crash (e.g., before the KeBugCheckEx functionality is implemented to bring secure workspace 130 down in a controlled manner).

Figure 2D:
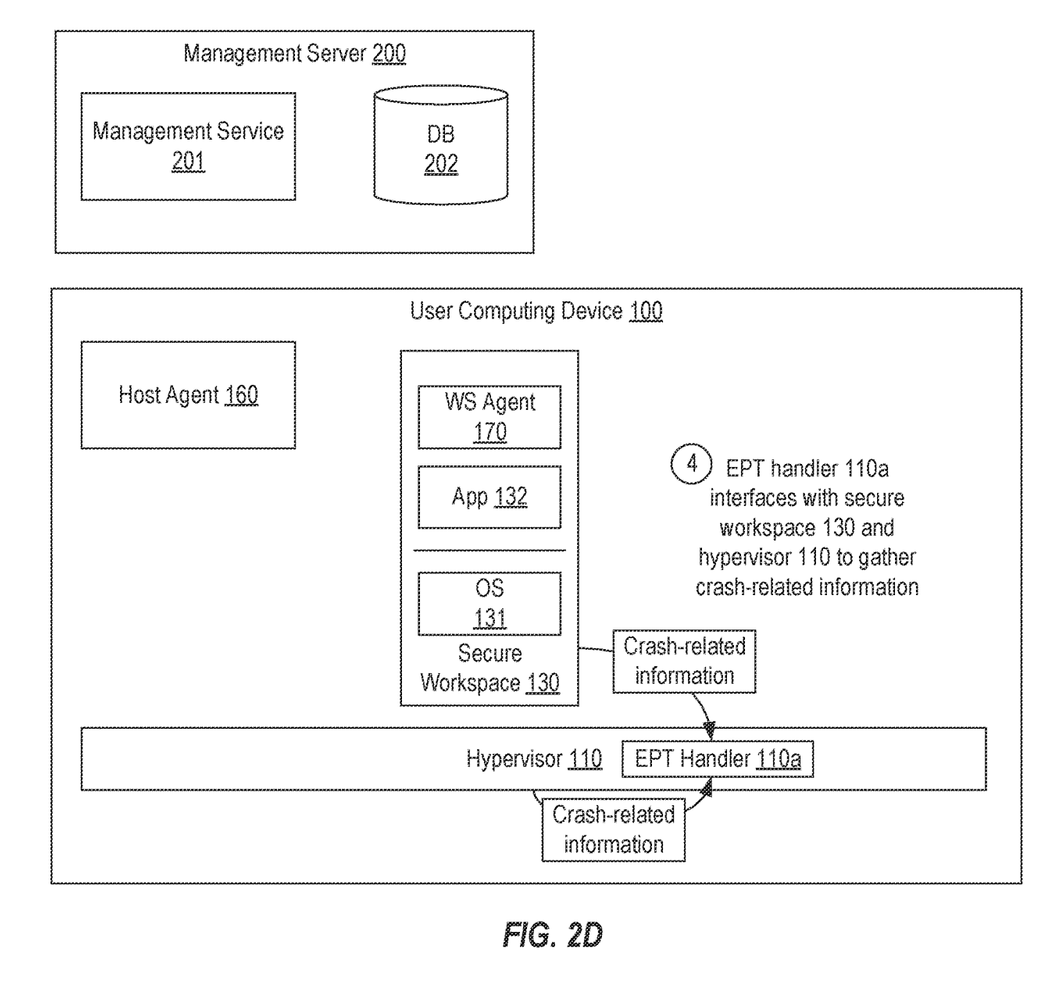

Turning to FIG. 2D, at this point, operating system 131 has stalled secure workspace 130 (e.g., because KeBugCheckEx has been invoked). In step 4 and while secure workspace 130 is in this pre-crash state, EPT handler 110a can gather crash-related information. For example, EPT handler 110a could obtain a memory snapshot of secure workspace 130's memory, could read the state of secure workspace 130's virtual CPU(s), and/or could read the state of user computing device 100's CPU(s). As further examples, EPT handle 110a could also or alternatively capture secure workspace 130's virtual machine control structure (VMCS) region in hypervisor 110, could determine nested virtualization information for hypervisor 110 (e.g., whether hypervisor 110 is running on physical hardware, within a virtual machine, etc.), and/or could capture a disk/memory overlay that hypervisor 110 has created on user computing device 100 for secure workspace 130.

Figure 2E:
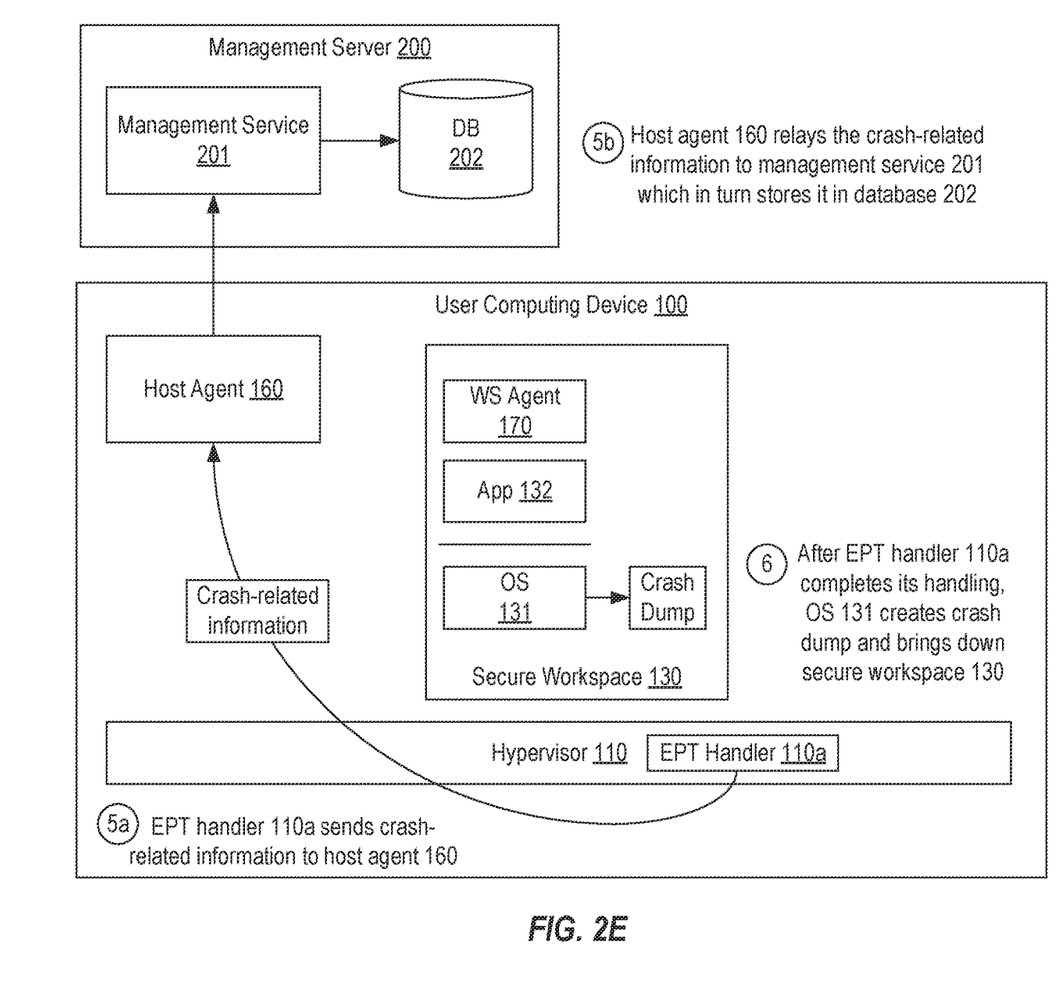

Turning to FIG. 2E, in step 5a, EPT handler 110a can send the crash-related information it collected to host agent 160. For example, EPT handler 110a could use IOCTLs to convey this crash-related information to host agent 160. Notably, this crash-related information that EPT handler 110a collects is "pre-crash," meaning that operating system 131 has not yet implemented its crash handling to bring secure workspace 130 down. In step 5b, host agent 160 can relay the crash-related information it receives from EPT handler 110a to management service 201 which in turn can store the crash-related information in database 202. Although not shown, EPT handler 110a and/or host agent 160 can include information to associate the crash-related information with secure workspace 130 (e.g., one or more identifiers of user computing device 100, secure workspace 130, app 132, etc.).

After step 5a, EPT handler 110a can return control to operating system 131 to proceed with its handling of the crash (e.g., to proceed with the KeBugCheckEx functionality). Accordingly, in step 6, operating system 131 can create a crash dump and bring down secure workspace 130.

Figure 2F:
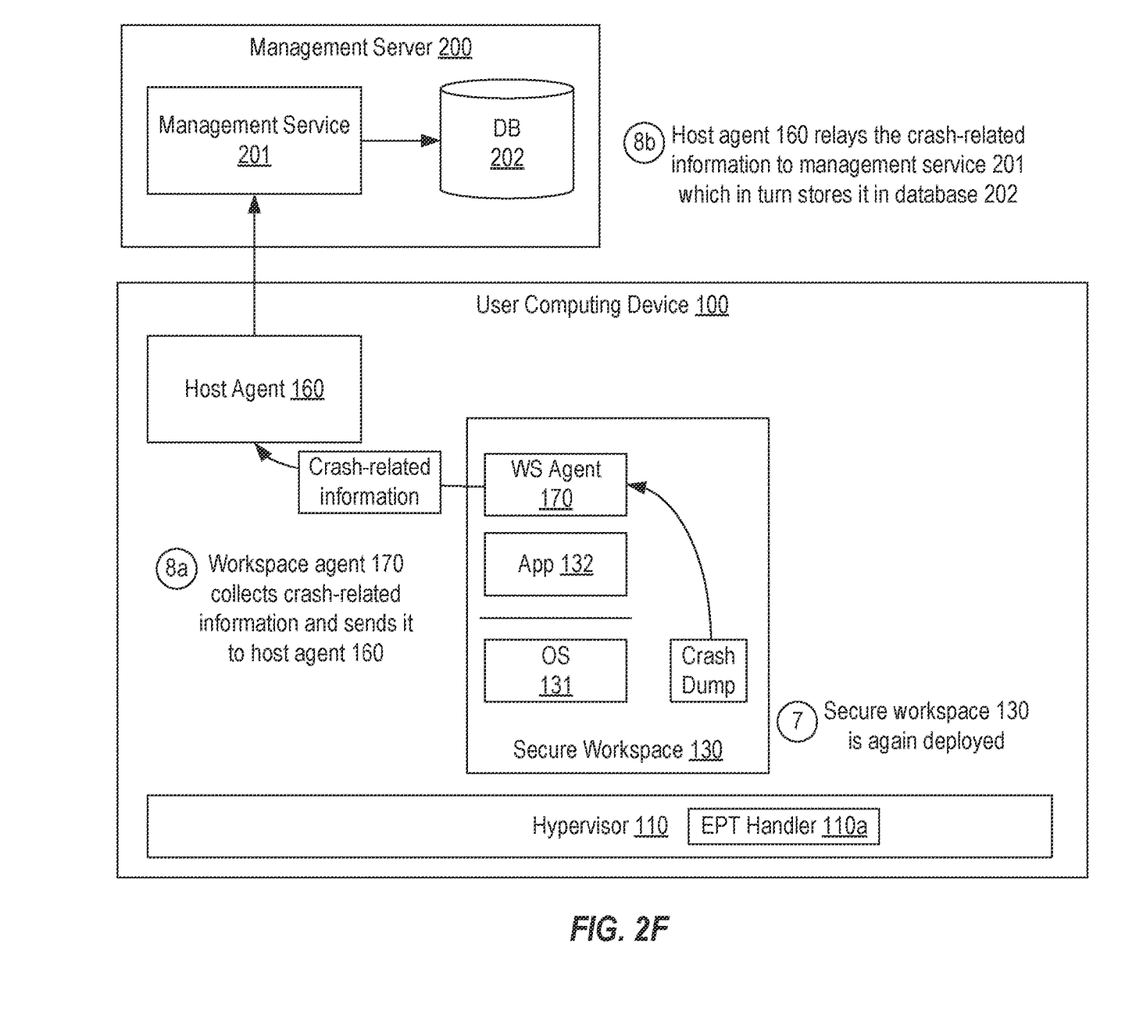

Turning to FIG. 2F, it is now assumed that secure workspace 130 was brought down and, in step 7, has been deployed again. Notably, the crash dump will still exist in secure workspace 130. In step 8a, workspace agent 170 can collect crash-related information, such as the crash dump which may include both a disk and memory dump, and send it to host agent 160. In step 8b, host agent 160 can relay this crash-related information to management service 201 for storage in database 202. In some embodiments, steps 5b and 8b could represent the same step. In other words, host agent 160 may wait to send the "pre-crash" crash-related information it received in step 5a together with the "post-crash" crash-related information it received in step 8a. In any case, the end result is that all this crash-related information is stored in database 202 where it can be accessed and analyzed to remediate the error that led to secure workspace 130's crash.

In summary, by leveraging EPT handler 110a within hypervisor 110, embodiments of the present invention enable all the crash-related information pertaining to a secure workspace to be collected. As a result, an administrator can review a complete picture of secure workspace 130 and its environment on user computing device 100 when attempting to remediate an error that led to a crash.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for collecting crash-related information for a secure workspace, the method comprising:
   in conjunction with deployment of a secure workspace on a user computing device, registering a handler in a hypervisor used to deploy the secure workspace, the handler being configured to be invoked when the secure workspace is about to crash;
   when the secure workspace is about to crash, collecting, by the handler, crash-related information for the secure workspace; and
   communicating the crash-related information to a host agent executing on the user computing device outside the secure workspace.

2. The method of claim 1, wherein the handler is an extended paging table handler.

3. The method of claim 1, wherein registering the handler comprises hooking an application programming interface that is called to initiate a crash.

4. The method of claim 3, wherein the application programming interface is KeBugCheckEx.

5. The method of claim 1, wherein the crash-related information includes a memory snapshot of the secure workspace's memory.

6. The method of claim 1, wherein the crash-related information includes state of one or more virtual CPUs of the secure workspace.

7. The method of claim 1, wherein the crash-related information includes state of one or more CPUs of the user computing device.

8. The method of claim 1, wherein the crash-related information includes a capture of a virtual machine control structure region of the hypervisor that pertains to the secure workspace.

9. The method of claim 1, wherein the crash-related information includes nested virtualization information for the hypervisor.

10. The method of claim 1, wherein the crash-related information includes a disk or memory overlay that the hypervisor created for the secure workspace.

11. The method of claim 1, further comprising:
    after the secure workspace has crashed and been redeployed, collecting, by a workspace agent running within the secure workspace, additional crash-related information; and
    communicating the additional crash-related information to the host agent.

12. The method of claim 11, further comprising:
    sending, by the host agent, the crash-related information and the additional crash-related information to a management service.

13. The method of claim 11, wherein the additional crash-related information includes a crash dump.

14. One or more computer storage media storing computer executable instructions which when executed implement a method for collecting crash-related information for a secure workspace, the method comprising:
    in conjunction with deployment of a secure workspace on a user computing device, registering a handler in a hypervisor used to deploy the secure workspace, the handler being configured to be invoked when the secure workspace is about to crash;
    when the secure workspace is about to crash, collecting, by the handler, crash-related information for the secure workspace;
    communicating the crash-related information to a host agent executing on the user computing device outside the secure workspace;
    after the crash, collecting, by a workspace agent executing inside the secure workspace, additional crash-related information; and
    communicating the additional crash-related information to the host agent.

15. The computer storage media of claim 14, wherein the method further comprises:

sending, by the host agent, the crash-related information and the additional crash-related information, to a management service.

16. The computer storage media of claim 14, wherein the crash-related information comprises one or more of:
a memory snapshot of the secure workspace's memory;
state of one or more virtual CPUs of the secure workspace;
state of one or more CPUs of the user computing device;
a capture of a virtual machine control structure region of the hypervisor that pertains to the secure workspace;
nested virtualization information for the hypervisor; or
a disk or memory overlay that the hypervisor created for the secure workspace.

17. The computer storage media of claim 14, wherein the additional crash-related information comprises a crash dump.

18. A system comprising:
a management server hosting a management service;
one or more user computing devices, each user computing device including a host agent and a hypervisor for deploying secure workspaces on the user computing device, wherein the hypervisor includes a handler that is configured to be invoked when a secure workspace is about to crash to collect crash-related information for the secure workspace and relay the crash-related information to the host agent.

19. The system of claim 18, wherein the crash-related information comprises one or more of:
a memory snapshot of the secure workspace's memory;
state of one or more virtual CPUs of the secure workspace;
state of one or more CPUs of the user computing device;
a capture of a virtual machine control structure region of the hypervisor that pertains to the secure workspace;
nested virtualization information for the hypervisor; or
a disk or memory overlay that the hypervisor created for the secure workspace.

20. The system of claim 18, wherein the secure workspace includes a workspace agent that is configured to collect additional crash-related information after the crash and to relay the additional crash-related information to the host agent, the additional crash-related information including a crash dump.

* * * * *